United States Patent
Yoshida

(10) Patent No.: US 10,155,372 B2
(45) Date of Patent: Dec. 18, 2018

(54) THREE-DIMENSIONAL PRINTING SYSTEM, AND METHOD OF PRINTING A THREE-DIMENSIONAL OBJECT

(71) Applicant: Roland DG Corporation, Hamamatsu-shi, Shizuoka (JP)

(72) Inventor: Makoto Yoshida, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 205 days.

(21) Appl. No.: 15/084,838

(22) Filed: Mar. 30, 2016

(65) Prior Publication Data
US 2016/0288426 A1 Oct. 6, 2016

(30) Foreign Application Priority Data

Apr. 1, 2015 (JP) ................................. 2015-075075

(51) Int. Cl.
 *B33Y 30/00* (2015.01)
 *G05B 19/4099* (2006.01)
 *B33Y 50/00* (2015.01)

(52) U.S. Cl.
 CPC ............... *B33Y 30/00* (2014.12); *B33Y 50/00* (2014.12); *G05B 19/4099* (2013.01); *G05B 2219/35134* (2013.01); *G05B 2219/49007* (2013.01); *G05B 2219/50093* (2013.01); *G06F 2217/12* (2013.01); *Y02P 90/265* (2015.11)

(58) Field of Classification Search
 CPC ...... G05B 19/4099; G05B 2219/50093; G05B 2219/49007; G05B 2219/35134; B33Y 50/00; B33Y 30/00; Y02P 90/265; G06F 19/00; G06F 2217/00; G06T 19/00; G06T 19/003; G06T 19/006; G06T 19/20; G06T 17/00; G06T 17/20; G06T 7/00; G06T 7/10; G06T 7/11; G06T 7/12; G06T 7/13

USPC ...... 425/162, 375, 174, 174.4; 700/118–120, 700/163
See application file for complete search history.

(56) References Cited

U.S. PATENT DOCUMENTS

| 5,610,824 A * | 3/1997 | Vinson .................. G06F 17/246 425/174.4 |
| 6,215,493 B1 * | 4/2001 | Fujita ..................... G06T 17/00 345/418 |

FOREIGN PATENT DOCUMENTS

| JP | 2003-535712 A | 12/2003 |
| WO | 00/52624 A1 | 9/2000 |

OTHER PUBLICATIONS

GoEngineer. Dec. 8, 2014. Stratasys Insight—Multiple Contours. Retrieved from https://www.youtube.com/watch?v=EoKI_A3fm7Y (Annotated description attached). (Year: 2014).*

* cited by examiner

*Primary Examiner* — Matthew J Daniels
*Assistant Examiner* — Leith S Shafi
(74) *Attorney, Agent, or Firm* — Keating & Bennett, LLP

(57) ABSTRACT

In a region determination device and method, when a set target contour is an island contour representing an outer profile of a three-dimensional printing object, it is determined whether a closest enclosing contour Lmin enclosing the target contour at a closest position thereto has been set for the slice model or not. When closest enclosing contour Lmin is determined to have been set, it is determined whether the closest enclosing contour Lmin is an island contour or not. When the closest enclosing contour Lmin is determined to be an island contour, the target contour is deleted from the slice model. Then, the region of the post-deletion slice model is divided into a printing region and a non-printing region.

8 Claims, 8 Drawing Sheets

THREE-DIMENSIONAL PRINTING SYSTEM, AND METHOD OF PRINTING A THREE-DIMENSIONAL OBJECT

CROSS REFERENCE OF RELATED APPLICATION

The present application claims priority from Japanese Patent Application No. 2015-075075 filed on Apr. 1, 2015, which is incorporated by reference herein in its entirety.

BACKGROUND OF THE INVENTION

1. Field of the Invention

The present invention relates to a region determination device for a slice model, a three-dimensional printing system, and a region determination method for a slice model.

2. Description of the Related Art

Conventionally, a three-dimensional printing device that prints a three-dimensional printing object is known. This type of three-dimensional printing device uses, for example, a computer-aided design device (CAD device) to create data of a three-dimensional model, which is usable to print a three-dimensional printing object (see, for example, Japanese PCT National-Phase Patent Publication No. 2003-535712). The three-dimensional model is sliced at a predetermined interval to create data of a slice model corresponding to a cross-sectional shape of the three-dimensional printing object. The three-dimensional printing device sequentially stacks resin material objects each having a cross-sectional shape corresponding to the data of the slice model while curing the resin material, and thus prints a desired three-dimensional printing object.

FIG. 8A is a plan view of a three-dimensional printing object A100. FIG. 8B is a side view of the three-dimensional printing object A100. The three-dimensional printing object A100 has a shape including two cylindrical objects having different diameters stacked in an up-down direction. The three-dimensional printing object A100 has a central part thereof cut out as seen in the plan view. FIG. 9 shows a slice model SM100 obtained as a result of slicing the three-dimensional printing object A100 at a position PT100 shown in FIG. 8B. In each of FIG. 8A, FIG. 8B and FIG. 9, the hatched region is a printing region. The slice model SM100 is defined by contours representing the shape of the three-dimensional printing object A100. The contours include, for example, a contour L101 representing an outer profile of the printing region of the three-dimensional printing object A100 and a contour L102 representing the shape of a hole in the three-dimensional printing object A100. In the following description, a contour representing an outer profile of a three-dimensional printing object will be referred to as an "island contour", and a contour representing the shape of a hole in a three-dimensional printing object will be referred to as a "hole contour".

In FIG. 9, a region D101 between the island contour L101 and the hole contour L102 is a printing region. A region D102 inner to the hole contour L102 represents the hole. The region D102 is a non-printing region, which is not to be printed.

In, for example, the slice model SM100, an advancing direction is set for each of the contours L101 and L102 in order to distinguish whether each of the contours L101 and L102 is an island contour or a hole contour. For example, the advancing direction of the island contour L101 is set to a clockwise direction. The advancing direction of the hole contour L102 is set to a counterclockwise direction. A computer determines whether a contour is an island contour or a hole contour based on the advancing direction of the contour.

The computer sets a straight scanning line SL100 that crosses the contours L101 and L102 and is to be scanned in a predetermined direction (e.g., in FIG. 9, in the left-to-right direction) in order to divide the region of the slice model SM100 into a printing region and a non-printing region. Also in the computer, a variable n (herein, referred to as an "internal level n") is set that is usable to divide the region of the slice model SM100 into a printing region and a non-printing region. For example, the internal level n has an initial value of "0". When the scanning line SL100 is scanned in a predetermined direction and crosses the contours L101 and L102, the computer determines in which direction the contours L101 and L102 cross the scanning line SL100. In this example, when the contour crosses the scanning line SL100 in a first direction (in FIG. 9, in the bottom-to-top direction), the value of the internal level n is increased by "1". By contrast, when the contour crosses the scanning line SL100 in a second direction (in FIG. 9, in the top-to-bottom direction) opposite to the first direction, the value of the internal level n is decreased by "1". In the case of the slice model SM100 shown in FIG. 9, the value of the internal level n is increased by "1" at intersections P101 and P103. The value of the internal level n is decreased by "1" at intersections P102 and P104. The computer determines a region corresponding to a value of the internal level n that is not "0" (in FIG. 9, region D101) to be a printing region. The computer determines a region corresponding to the value of the internal level n that is "0" (in FIG. 9, region D102) to be a non-printing region.

FIG. 10 shows a slice model SM110 obtained as a result of slicing the three-dimensional printing object A100 at a position PT110 shown in FIG. 8B. In FIG. 8B, the position PT110 is a border between the two cylindrical objects included in the three-dimensional printing object A100. Therefore, the slice model SM110 shown in FIG. 10 includes an island contour L111 representing a profile of a top end of the lower cylindrical object and an island contour L112 representing a profile of a bottom end of the upper cylindrical object. In FIG. 10, the hatched regions are printing regions. In FIG. 10, the island contour L112 is provided between the island contour L111 and a hole contour L113. In the slice model SM110, a region D111 between the island contour L111 and the island contour L112, and a region D112 between the island contour L112 and the hole contour L113, each of them is a printing region. By contrast, a region D113 inner to the hole contour L113 is a non-printing region.

The computer sets a scanning line SL110 crossing the contours of the slice model SM110. The computer causes the scanning line SL110 to be scanned to change the value of the internal level n, and thus divides the region of the slice model SM110 into a printing region and a non-printing region. In this process, the internal level n is increased by "1" at each of intersections P111 and P112. As a result, the value of the internal level n is "2" at the intersection P112. At an intersection P113, the value of the internal level n is decreased by "1". As a result, the value of the internal level n is "1". In the same manner, the value of the internal level n is "2" at an intersection P114. At an intersection P115, the value of the internal level n is "1". At an intersection P116, the value of the internal level n is "0".

The computer determines a region corresponding to the value of the internal level n that is "0" to be a non-printing region. As described above, in the slice model SM110, the region D113 should be a non-printing region. However, the value of the internal level n corresponding to the region D113 is "1", and therefore, the computer may undesirably determine that the region D113 is a printing region.

SUMMARY OF THE INVENTION

Preferred embodiments of the present invention provide a region determination device for a slice model, a three-dimensional printing system and a region determination method for a slice model capable of appropriately dividing the region of a slice model, obtained as a result of slicing a three-dimensional model of a three-dimensional printing object to be printed, into a printing region and a non-printing region.

A region determination device for a slice model according to a preferred embodiment of the present invention divides a region of the slice model into a printing region to be printed and a non-printing region not to be printed, the slice model being obtained as a result of slicing a three-dimensional model of a three-dimensional printing object at a predetermined interval and being defined by contours representing profiles of the three-dimensional printing object. The contours include an island contour representing a shape of an outer profile of the printing region of the three-dimensional printing object and a hole contour representing a shape of a hole in the three-dimensional printing object. The region determination device includes a storage processor, a target contour setting processor, a first contour determination processor, a closest enclosing contour determination processor, a second contour determination processor, a deletion processor, and a region determination processor. The storage processor is configured or programmed to store the slice model. The target contour setting processor is configured or programmed to extract a predetermined contour from the contours of the slice model stored by the storage processor and to set the extracted predetermined contour as a target contour. The first contour determination processor is configured or programmed to determine whether the target contour set by the target contour setting processor is the island contour or not. The closest enclosing contour determination processor is configured or programmed to, in the case where the target contour is determined by the first contour determination processor to be the island contour, determine whether a closest enclosing contour enclosing the target contour at a closest position thereto has been set or not. The second contour determination processor is configured or programmed to, in the case where the closest enclosing contour is determined by the closest enclosing contour determination processor to have been set, determine whether the closest enclosing contour is the island contour or not. The deletion processor is configured or programmed to, in the case where the closest enclosing contour is determined by the second contour determination processor to be the island contour, delete the target contour from the slice model and store, on the storage processor, a slice model obtained as a result of deleting the target contour from the slice model. The region determination processor is configured or programmed to divide the region of the slice model stored on the storage processor into the printing region and the non-printing region.

Conventionally, in the case of, for example, the slice model SM110 in which the island contour L111 and the hole contour L113 have another contour L112 therebetween as shown in FIG. 10, the region D113 may be undesirably determined to be a printing region although the region D113 is a non-printing region. A conceivable reason for this is that the contour enclosing the island contour L112 at the closest position thereto is the island contour L111. This may occur to the slice model SM110 obtained as a result of slicing the three-dimensional printing object A100 at a border between the plurality of objects included in the three-dimensional printing object A100, for example, at the position P110 shown in FIG. 8B. The island contour L112 is an unnecessary contour for making a determination on the printing region. In this situation, the region determination device uses the closest enclosing contour determination processor to determine whether or not the closest enclosing contour, which encloses the target contour at the closet position thereto, has been set for the target contour, which is an island contour. Herein, the "closest enclosing contour" refers to a contour, among the contours enclosing the target contour, that encloses the target contour at the closest position, namely, a contour that encloses the target contour at the immediately close position. In the case where the closest enclosing contour determination processor determines that the closest enclosing contour has been set, the second contour determination processor determines whether the closest enclosing contour is an island contour or not. In the case where the closest enclosing contour is an island contour, the deletion processor deletes the target contour from the slice model. In this manner, an island contour unnecessary for making a determination on the printing region, such as the island contour L111 shown in FIG. 10, is deleted from the slice model. Therefore, even in the case where, for example, the island contour L112 is enclosed by the island contour L111 at the closest position thereto as in the slice model SM110 shown in FIG. 10, the region of the slice model SM110 is divided into a printing region and a non-printing region with certainty.

According to a preferred embodiment of the present invention, the closest enclosing contour determination processor includes a scanning line setting processor, a count processor, a first enclosure determination processor, a distance calculation processor, and a second enclosure determination processor. The scanning line setting processor is configured or programmed to set a scanning line directed in a predetermined direction from a predetermined point on the target contour. The count processor is configured or programmed to count the number of intersection(s) at which the scanning line set by the scanning line setting processor and one contour, other than the target contour among the contours of the slice model, cross each other. The first enclosure determination processor is configured or programmed to, in the case where the number of the intersection(s) counted by the count processor is an odd number, determine that the one contour is located so as to enclose the target contour, and in the case where number of the intersection(s) counted by the count processor is an even number, determine that the one contour is not located so as to enclose the target contour. The distance calculation processor is configured or programmed to, in the case where the one contour is determined by the first enclosure determination processor to be located so as to enclose the target contour, calculate a distance between the target contour and the one contour. The second enclosure determination processor is configured or programmed to, in the case where there are a plurality of the contours determined by the first enclosure determination processor to be located so as to enclose the target contour, determine the one contour, corresponding to a shortest distance among the distances calculated by the distance calculation processor, to be the closest enclosing contour. The second contour determination processor is configured or programmed to determine whether the closest enclosing contour determined by the second enclosure determination processor is the island contour or not.

In the above preferred embodiment, in the case where the number of intersection(s) at which the scanning line set on the slice model and one contour other than the target contour cross each other is an odd number, the one contour encloses the target contour. In the case where there are a plurality of such one contours enclosing the target contour, one contour located at the closest position to the target contour among the plurality of the one contours is determined to be the closest enclosing contour. In the case where the closest enclosing contour is an island contour, the target contour is deleted from the slice model.

According to another preferred embodiment of the present invention, the region determination device for a slice model further includes an advancing direction setting processor that sets an advancing direction of the island contour of the slice model stored by the storage processor to a first direction and sets an advancing direction of the hole contour of the slice model to a second direction opposite to the first direction. The first contour determination processor is configured or programmed to, in the case where the advancing direction of the target contour set by the target contour setting processor is the first direction set by the advancing direction setting processor, determine the target contour to be the island contour. The second contour determination processor is configured or programmed to, in the case where the advancing direction of the closest enclosing contour is the first direction set by the advancing direction setting processor, determine the closest enclosing contour to be the island contour.

According to the above preferred embodiment, the first contour determination processor easily determines whether the target contour is an island contour or not by determining whether the advancing direction of the target contour is the first direction or not. The second contour determination processor easily determines whether the closest enclosing contour is an island contour or not by determining whether the advancing direction of the closest enclosing contour is the first direction or not.

A three-dimensional printing system according to a preferred embodiment of the present invention includes a three-dimensional printing device that prints a three-dimensional printing object, and a region determination device for a slice model according to any of the preferred embodiments of the present invention described above.

According to a three-dimensional printing system, a region determination device for a slice model according to any of the preferred embodiments of the present invention described above is included.

A region determination method for a slice model according to a preferred embodiment of the present invention divides a region of the slice model into a printing region to be printed and a non-printing region not to be printed, the slice model being obtained as a result of slicing a three-dimensional model of a three-dimensional printing object at a predetermined interval and being defined by contours representing profiles of the three-dimensional printing object. The contours include an island contour representing a shape of an outer profile of the printing region of the three-dimensional printing object and a hole contour representing a shape of a hole in the three-dimensional printing object. The region determination method includes a storage step, a target contour setting step, a first contour determination step, a closest enclosing contour determination step, a second contour determination step, a deletion step, and a region determination step. In the storage step, the slice model is stored. In the target contour setting step, a predetermined contour is extracted from the contours of the slice model stored in the storage step and the extracted predetermined contour is set as a target contour. In the first contour determination step, it is determined whether the target contour set in the target contour setting step is the island contour or not. In the closest enclosing contour determination step, in the case where the target contour is determined in the first contour determination step to be the island contour, it is determined whether a closest enclosing contour enclosing the target contour at a closest position thereto has been set or not. In the second contour determination step, in the case where the closest enclosing contour is determined in the closest enclosing contour determination step to have been set, it is determined whether the closest enclosing contour is the island contour or not. In the deletion step, in the case where the closest enclosing contour is determined in the second contour determination step to be the island contour, the target contour is deleted from the slice model and a slice model obtained as a result of deleting the target contour from the slice model is stored. In the region determination step, the region of the slice model stored in the storage step or the deletion step is divided into the printing region and the non-printing region.

According to still another preferred embodiment of the present invention, the closest enclosing contour determination step includes a scanning line setting step, a count step, a first enclosure determination step, a distance calculation step, and a second enclosure determination step. In the scanning line setting step, a scanning line directed in a predetermined direction from a predetermined point on the target contour is set. In the count step, the number of intersection(s) at which the scanning line set in the scanning line setting step and one contour, other than the target contour among the contours of the slice model, cross each other is counted. In the first enclosure determination step, in the case where the number of the intersection(s) counted in the count step is an odd number, it is determined that the one contour is located so as to enclose the target contour, and in the case where number of the intersection(s) counted in the count step is an even number, it is determined that the one contour is not located so as to enclose the target contour. In the distance calculation step, in the case where the one contour is determined in the first enclosure determination step to be located so as to enclose the target contour, a distance between the target contour and the one contour is calculated. In the second enclosure determination step, in the case where there are a plurality of the one contours determined in the first enclosure determination step to be located so as to enclose the target contour, the one contour, corresponding to a shortest distance among the distances calculated in the distance calculation step, is determined to be the closest enclosing contour. In the second contour determination step, it is determined whether the closest enclosing contour determined in the second enclosure determination step is the island contour or not.

According to still another preferred embodiment of the present invention, the region determination method for a slice model further includes an advancing direction setting step of setting an advancing direction of the island contour of the slice model stored in the storage step to a first direction and setting an advancing direction of the hole contour of the slice model to a second direction opposite to the first direction. In the first contour determination step, in the case where the advancing direction of the target contour set in the target contour setting step is the first direction set in the advancing direction setting step, the target contour is determined to be the island contour. In the second contour determination step, in the case where the advancing direction of the closest enclosing contour is the first direction set in the advancing direction setting step, the closest enclosing contour is determined to be the island contour.

According to various preferred embodiments of the present invention, the region of a slice model obtained as a result of slicing, at a predetermined interval, a three-dimensional model of a three-dimensional printing object to be printed is divided into a printing region and a non-printing region appropriately.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, three-dimensional printing systems including region determination devices for a slice model (hereinafter, referred to as a region determination device") according to preferred embodiments of the present invention will be described. The preferred embodiment described below is not intended to limit the present invention to any specific preferred embodiment in any way. Elements and sites having identical functions bear identical reference signs, and the same descriptions may be omitted appropriately or simplified.

Figure 1:
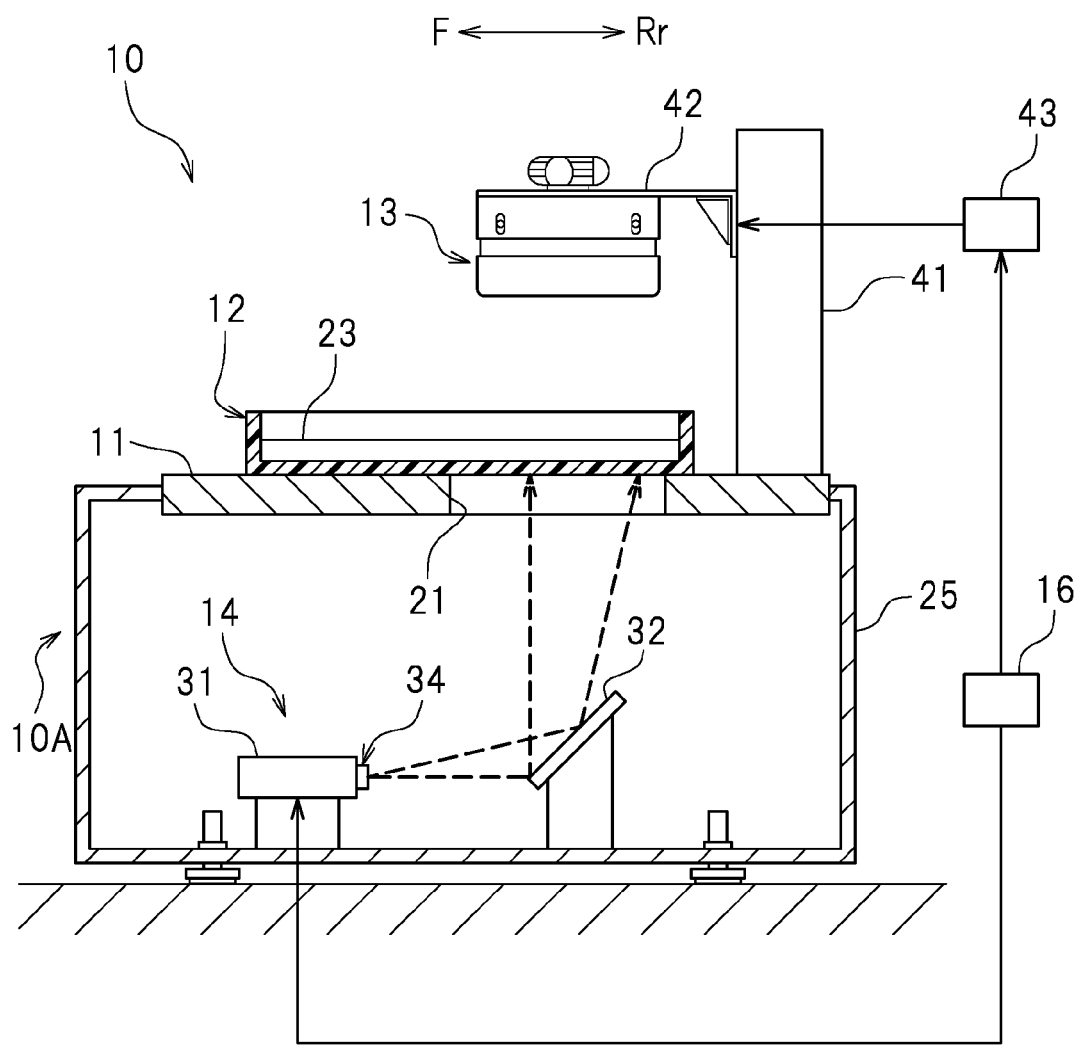
FIG. 1 is a cross-sectional view of a three-dimensional printing system according to a preferred embodiment of the present invention.
Figure 2:
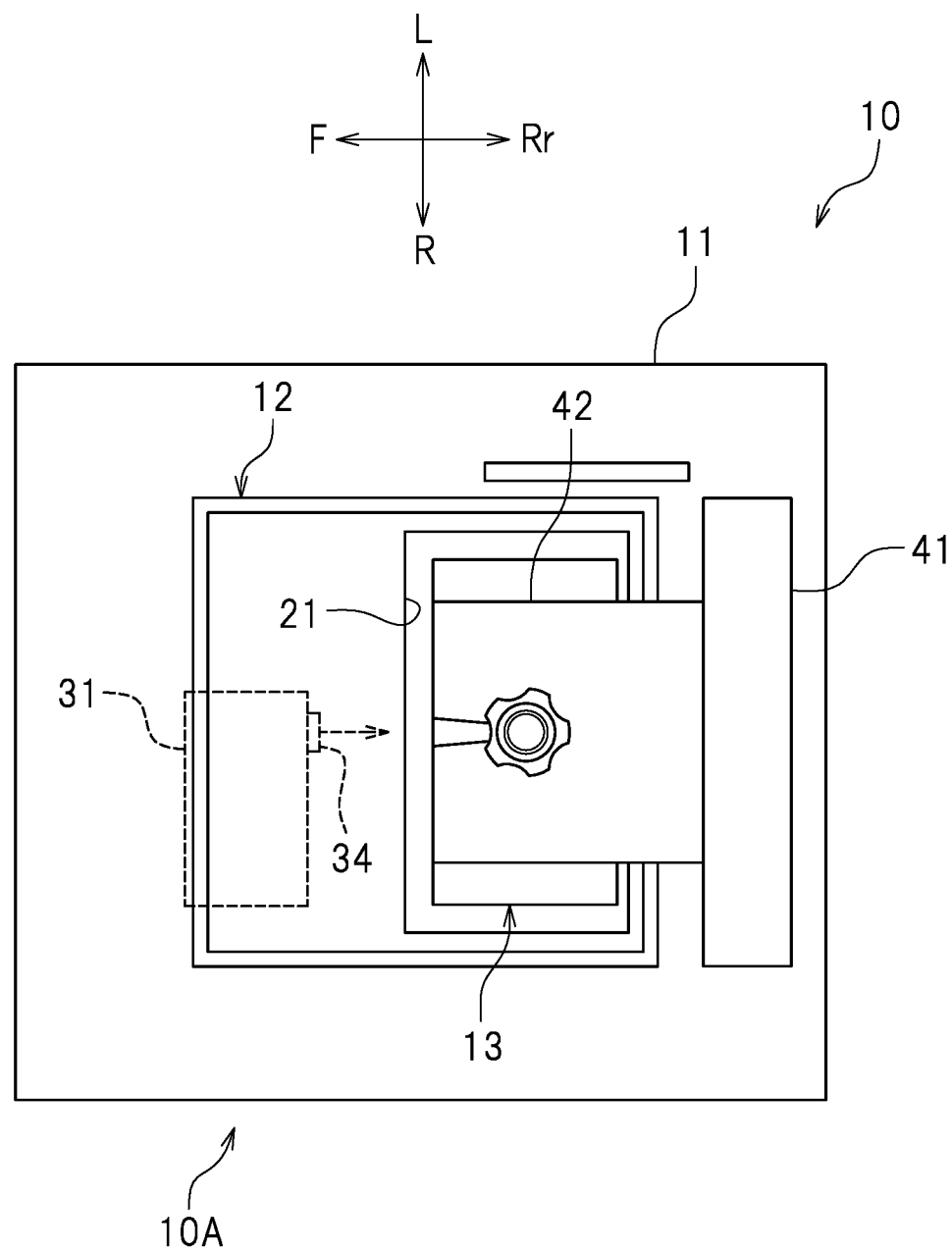
FIG. 2 is a plan view of the three-dimensional printing system according to a preferred embodiment of the present invention.
Figure 3:
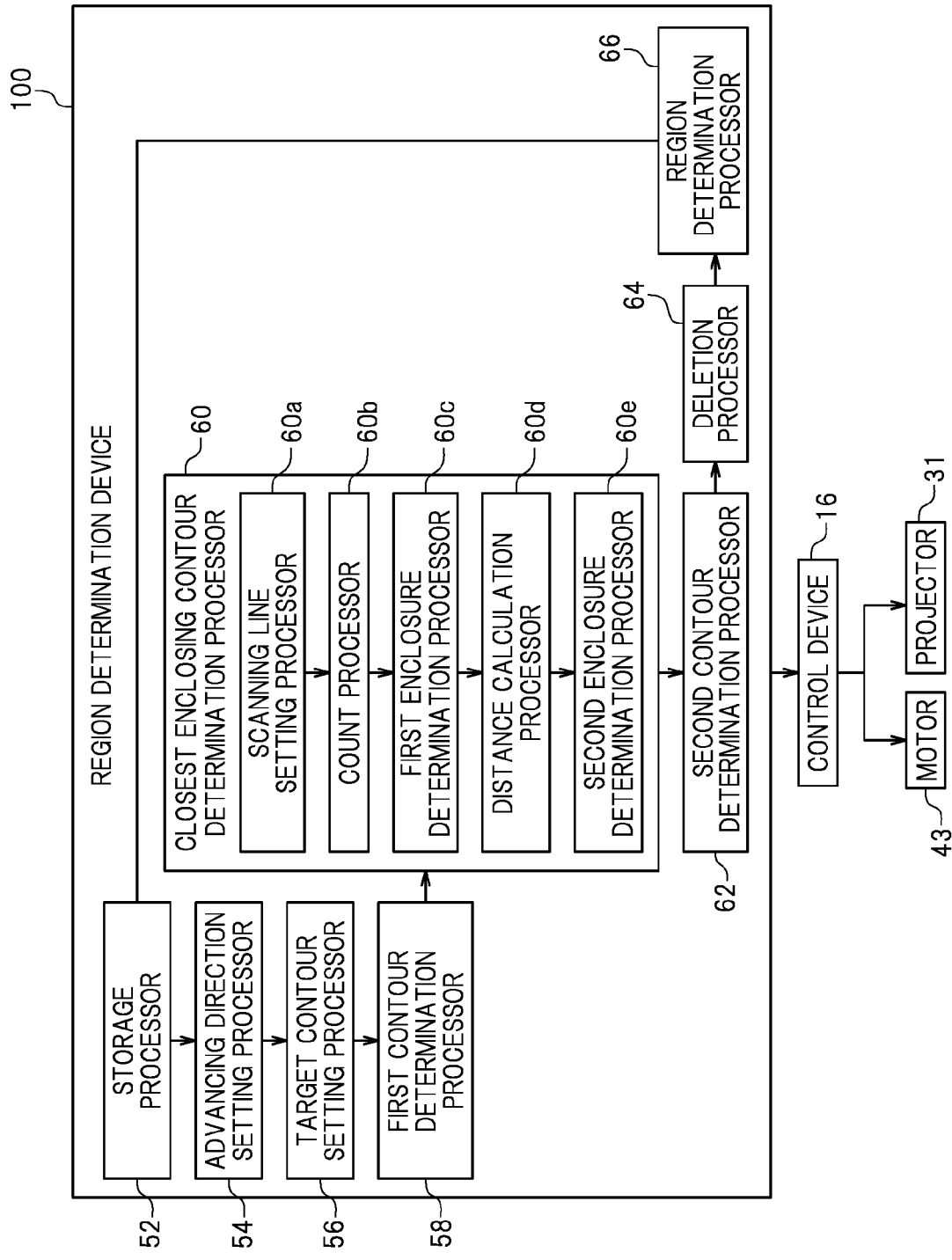
FIG. 3 is a block diagram of the three-dimensional printing system according to a preferred embodiment of the present invention.

FIG. 1 is a cross-sectional view of a three-dimensional printing system 10 according to a preferred embodiment of the present invention. FIG. 2 is a plan view of the three-dimensional printing system 10. FIG. 3 is a block diagram of the three-dimensional printing system 10. In the drawings, letters F, Rr, L and R respectively represent front, rear, left and right. These directions are provided merely for the sake of convenience, and do not limit the form of installment of the three-dimensional printing system 10 in any way.

The three-dimensional printing system 10 is a system that prints a three-dimensional printing object. As shown in FIG. 1, the three-dimensional printing system 10 includes a three-dimensional printing device 10A and a region determination device 100 (see FIG. 3). In this preferred embodiment, a cross-sectional shape of a three-dimensional printing object is prepared in advance. The three-dimensional printing device 10A cures a photocurable resin in a liquid state to form a resin layer having a shape corresponding to the prepared cross-sectional shape and sequentially stacks such resin layers to print a three-dimensional printing object. Herein, the term "cross-sectional shape" refers to the shape of a cross-section obtained as a result of slicing a three-dimensional printing object at a predetermined thickness (e.g., 0.1 mm). A "photocurable resin" is a resin that is cured when being irradiated with light including a light component having a predetermined wavelength. The three-dimensional printing device 10A includes a table 11, a tank 12, a holder 13, an optical device 14, and a controller 16.

The table 11 is supported by a case 25. The table 11 is provided with an opening 21 through which light to be directed to a photocurable resin 23 is allowed to pass. The tank 12 accommodates the photocurable resin 23 in a liquid state. The tank 12 is placed on the table 11 so as to be attachable to the table 11. As shown in FIG. 2, the tank 12 covers the opening 21 of the table 11 when being placed on the table 11. The tank 21 may be formed of a light-transmissive material. The tank 12 may be formed of, for example, a transparent material.

As shown in FIG. 1, the holder 13 is located above the tank 12 and above the opening 21 of the table 11. The holder 13 is movable up and down so as to be immersed in the photocurable resin 23 in the tank 12 when being lowered and to pull up the photocurable resin 23, cured as a result of being irradiated with light, when being raised up. In this example, the table 11 is provided with a column 41 extending in an up-down direction. A slider 42 is attached to the front of the column 41. The slider 42 is movable up and down along the column 41. The slider 42 is movable up and down by a motor 43. In this example, the holder 13 is attached to the slider 42. The holder 13 is located to the front of the column 41. The holder 31 is movable up and down by the motor 43.

The optical device 14 is located below the table 11. The optical device 14 directs light having a predetermined wavelength toward the photocurable resin 23 in a liquid state that is accommodated in the tank 12. The optical device 14 is accommodated in the case 25 provided below the table 11. The optical device 14 includes a projector 31 and a mirror 32. The projector 31 is a light source emitting light. The optical device 14 is located below a front portion of the table 11. The projector 31 is located to the front of the holder 13. A lens 34 is located to the rear of the projector 31. The projector 31 emits light in a front-to-rear direction via the lens 34. The mirror 32 reflects the light, emitted from the projector 31, toward the tank 12. The mirror 32 is located below the opening 21 in the table 11 and to the rear of the projector 31. The light emitted from the projector 31 is reflected by the mirror 32 and is directed toward the photocurable resin 23 in the tank 12 via the opening 21 of the table 11.

The controller 16 is connected with the motor 43 controlling the slider 42, having the holder 13 attached thereto, to be movable up and down, and is also connected with the projector 31 in the optical device 14. The controller 16 is configured or programmed to drive the motor 43 to move the slider 42 and the holder 13 upward or downward. The controller 16 controls the energy, luminosity, amount, wavelength band, and shape of the light emitted from the projector 31, the position of the photocurable resin 23 that is to be irradiated with the light, the timing to emit the light, and the like. There is no specific limitation on the structure of the controller 16. For example, the controller 16 may be a computer and may include a central processing unit (hereinafter, referred to as a "CPU") and a ROM, a RAM or the like storing a program or the like to be executed by the CPU.

The structure of the three-dimensional printing device 10A in this preferred embodiment has been described. Three-dimensional printing device 10A in this preferred embodiment prepares data of a three-dimensional model corresponding to a three-dimensional printing object to be printed (hereinafter, such data will be referred to as "printing object model"). The printing object model is sliced in a horizontal direction at a predetermined interval to prepare a plurality of units of data of two-dimensional slice models respectively corresponding to cross-sectional shapes of the three-dimensional printing object. The direction in which the printing object model is sliced is not limited to the horizontal direction. The direction in which the printing object model is sliced may be, for example, a vertical direction. In this example, the "data on the slice model" is STL data. Hereinafter, the data of the two-dimensional slice model may also be referred to simply as a "slice model". In this example, the three-dimensional printing device 10A cures the photocurable resin 23 in a liquid state to form a resin layer having a shape corresponding to the cross-sectional shape of the slice model and sequentially stacks such resin layers to print a three-dimensional printing object.

Figure 8A:
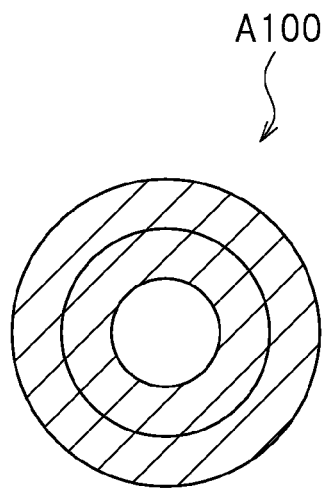
FIG. 8A shows a conventional technology and is a plan view of a three-dimensional printing object.
Figure 8B:
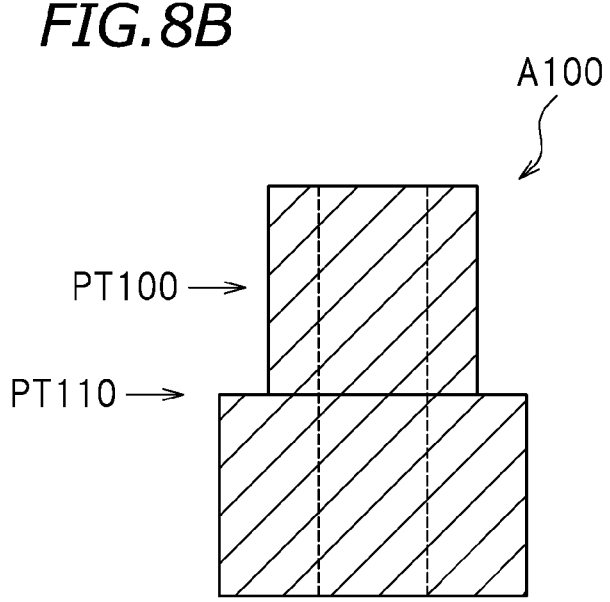
FIG. 8B is a side view of the three-dimensional printing object.
Figure 9:
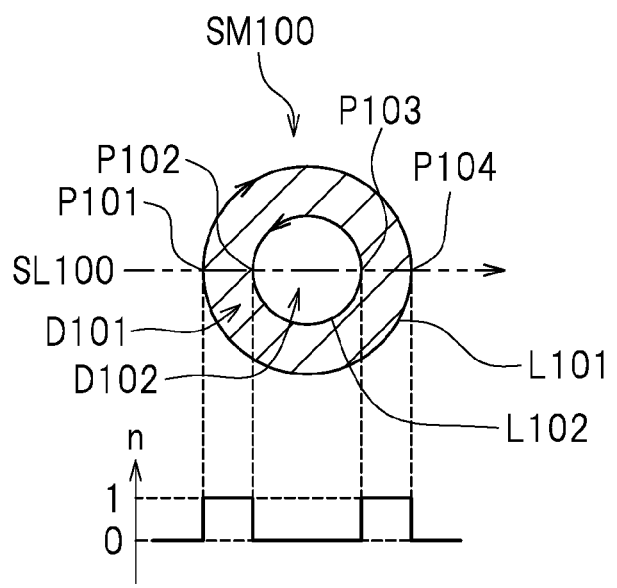
FIG. 9 shows the conventional technology and shows a slice model obtained as a result of slicing the three-dimensional printing object at a position PT100 shown in FIG. 8B.

As shown in FIG. 9, for example, the slice model SM100 of the three-dimensional printing object A100 to be printed is defined by contours representing the shape of the three-dimensional printing object A100 (see FIG. 8A and FIG. 8B). The contours include, for example, the island contour L101 representing the outer profile of the three-dimensional printing object A100 and the hole contour L102 representing the shape of the hole in the three-dimensional printing object A100. The region D101 inner to the island contour L101 and outer to the hole contour L102 is a region for which the photocurable resin 23 is to be cured, namely, a printing region. By contrast, the region D102 inner to the hole contour L102 (in the case where there is another island contour inner to the hole contour L102, the region D102 is inner to the hole contour L102 and outer to the another island contour) is a region representing the hole. The region D102 is a region for which the photocurable resin 23 is not to be cured, namely, a non-printing region, which is not to be printed.

In this example, an advancing direction is set for each of the island contour L101 and the hole contour L102 of the slice model SM100 in order to distinguish the contours L101 and L102 from each other. For example, the advancing direction of the island contour L101 is a clockwise direction. The advancing direction of the hole contour L102 is a counterclockwise direction. It is sufficient that the advancing direction of the island contour L101 and the advancing direction of the hole contour L102 are different from each other. For example, the advancing direction of the island contour L101 may be the counterclockwise direction, whereas the advancing direction of the hole contour L102 may be the clockwise direction.

Figure 4:
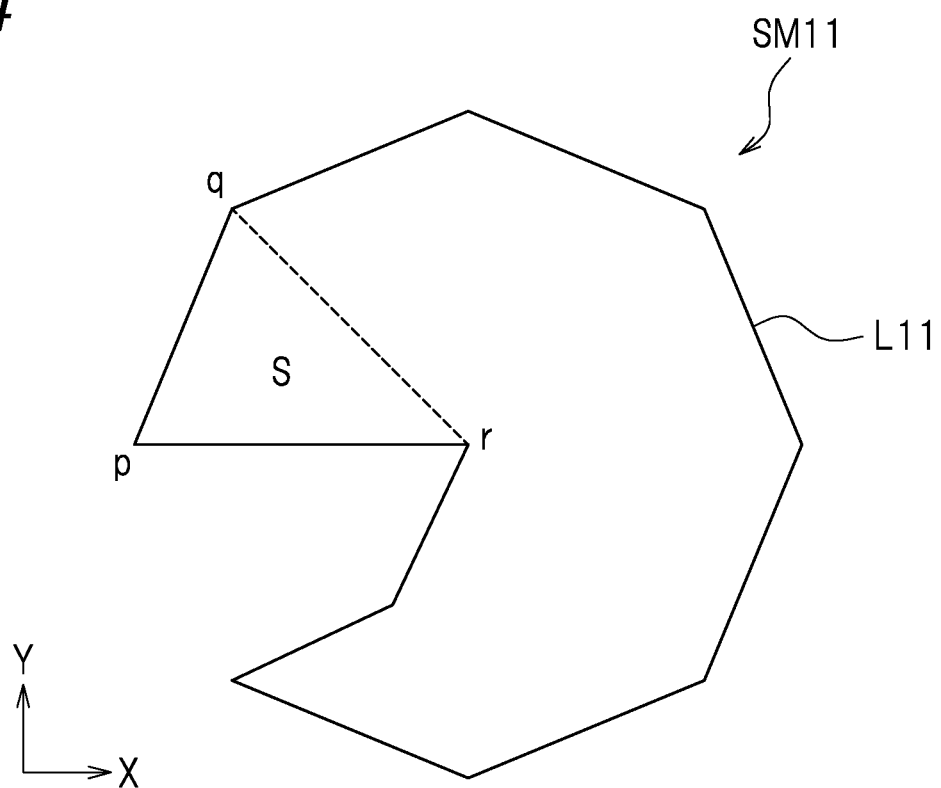
FIG. 4 shows a procedure of distinguishing whether a contour of a slice model is an island contour or a hole contour.

In the case where the advancing directions of the contours of the slice model are not clear and thus it is not clear whether each contour is an island contour or a hole contour, the determination on the contours may be performed as follows. FIG. 4 shows a procedure of determining whether a contour L11 of a slice model SM11 is an island contour or a hole contour. Hereinafter, the procedure of determining whether the contour L11 of the slice model SM11 is an island contour or a hole contour (hereinafter, referred to as "contour determination") will be described with reference to the slice model SM11 shown in FIG. 4. In this example, a "triangular area size with a sign" is preferably used to perform the contour determination. The "triangular area size with a sign" is a triangle area size provided with a positive or negative sign. For example, in the case of the contour L11 defining a polygon as shown in FIG. 4, first, arbitrary protruding apex having an acute angle is extracted. In this example, apex p, for example, is extracted. Next, apex q and apex r, which are adjacent to apex p, are extracted. Then, an area size with a sign of triangle Δpqr is determined. Where the area size with a sign of triangle Δpqr is S, area size S is represented by the following expression (1).

$$S=(p_x-r_x)\cdot(q_y-r_y)-(q_x-r_x)\cdot(p_y-r_y) \quad (1)$$

In expression (1), $p_x$ and $p_y$ respectively represent the x coordinate and the y coordinate of apex p. $q_x$ and $q_y$ respectively represent the x coordinate and the y coordinate of apex q. $r_x$ and $r_y$ respectively represent the x coordinate and the y coordinate of apex r. In the case where the area size S is smaller than "0", namely, in the case where the area size S is of a negative value, the contour L11 is determined to be an island contour. By contrast, in the case where the area size S is larger than "0", namely, in the case where the area size S is of a positive value, the contour L11 is determined to be a hole contour. Next, the area size with a sign of triangle Δpqr and the advancing direction of the contour L11 are associated with each other. In the case where the area size S is of a negative value, the advancing direction of the contour L11 is set to, for example, a first direction (in this example, clockwise direction). In the case where the area size S is of a positive value, the advancing direction of the contour L11 is set to a second direction (in this example, counterclockwise direction) opposite to the first direction.

As described above, in the slice model SM110 shown in FIG. 10, the island contour L112 is provided between the island contour L111 and the hole contour L113. In this example, the region D111 between the island contour L111 and the island contour L112, and the region D112 between the island contour L112 and the hole contour L113, are each a printing region. By contrast, the region D113 inner to the hole contour L113 is a non-printing region.

Figure 10:
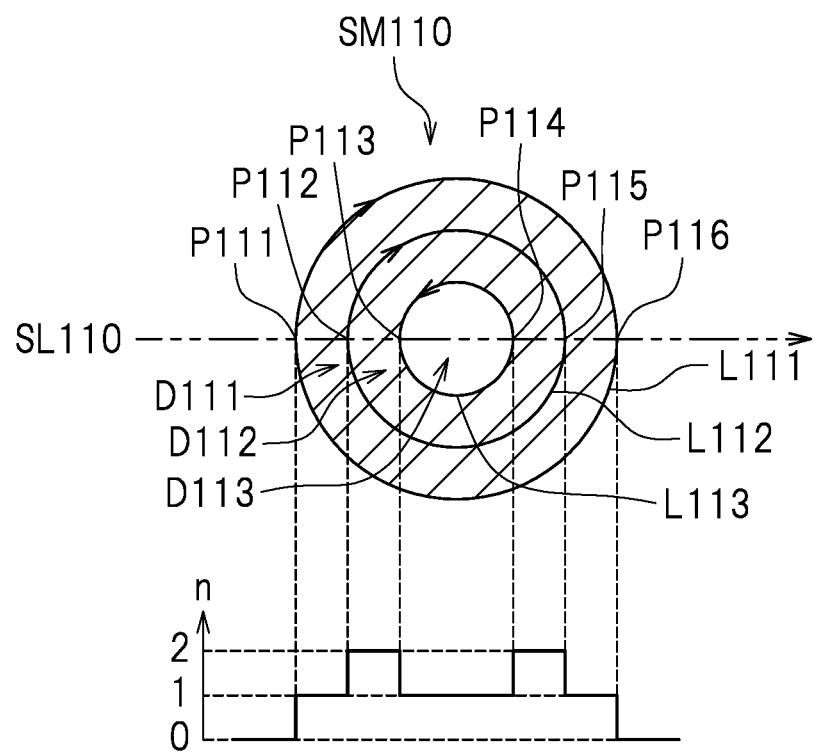
FIG. 10 shows the conventional technology and shows a slice model obtained as a result of slicing the three-dimensional printing object at a position PT110 shown in FIG. 8B.

The scanning line SL110 is set as shown in, for example FIG. 10. The scanning line SL110 is scanned to change the value of an internal level n. Based on the value of the internal level n, the region of the slice model SM110 is divided into a printing region and a non-printing region. In this process, as shown in FIG. 10, the value of the internal level n is "2" at the intersection P112. At the intersection P113, the value of the internal level n is "1". At the intersection P114, the value of the internal level n is "2". The region D113 should be a non-printing region. However, the value of the internal level n corresponding to the region D113 is "1", and therefore, the computer may undesirably determine that the region D113 is a printing region.

A conceivable reason why the computer makes such a wrong determination on the printing region is that the island contour L112 is provided between the island contour L111 and the hole contour L113. The island contour L112 is provided in the case where the slice model SM110 is created by slicing the three-dimensional model of the three-dimensional printing object A100 at a border between a plurality of objects included in the three-dimensional printing object A100 such as, for example, at the PT110 shown in FIG. 8B. The provision of the island contour L112 causes the computer to make a wrong determination on the printing region of the slice model SM110. The island contour L112 is unnecessary for making a determination on the printing region of the slice model SM110. In this example, the island contour L112 is considered as unnecessary in the case where a closest enclosing contour enclosing the island contour L112 at a closest position thereto is an island contour. In the case of the slice model SM110 shown in FIG. 10, the closest enclosing contour for the island contour L112 is the island contour L111. Therefore, the island contour L112 is unnecessary. The unnecessary island contour L112 is deleted from the slice model SM110, so that the region of the slice model SM110 is divided into a printing region and a non-printing region accurately.

Therefore, in this preferred embodiment, the region determination device 100 shown in FIG. 3 is used to delete the unnecessary contour from the slice model and then determine which region of the slice model is a printing region and which region thereof is a non-printing region (hereinafter, such a determination will be referred to as a "region determination"). The region determination device 100 determines which region of a slice model, obtained as a result of slicing, at a predetermined interval, a three-dimensional model of a three-dimensional printing object to be printed, is a printing region and which region thereof is a non-printing region. The region determination device 100 may be separate from the three-dimensional printing device 10A or may be built in the three-dimensional printing device 10A. For example, the region determination device 100 may be a computer and may include a ROM, a RAM or the like storing a program or the like to be executed by a CPU. In this example, a program stored on the computer is used to make a determination on the regions of the slice model. The region determination device 100 may be a computer dedicated for the three-dimensional printing system 10 or a multi-purpose computer.

Figure 5:
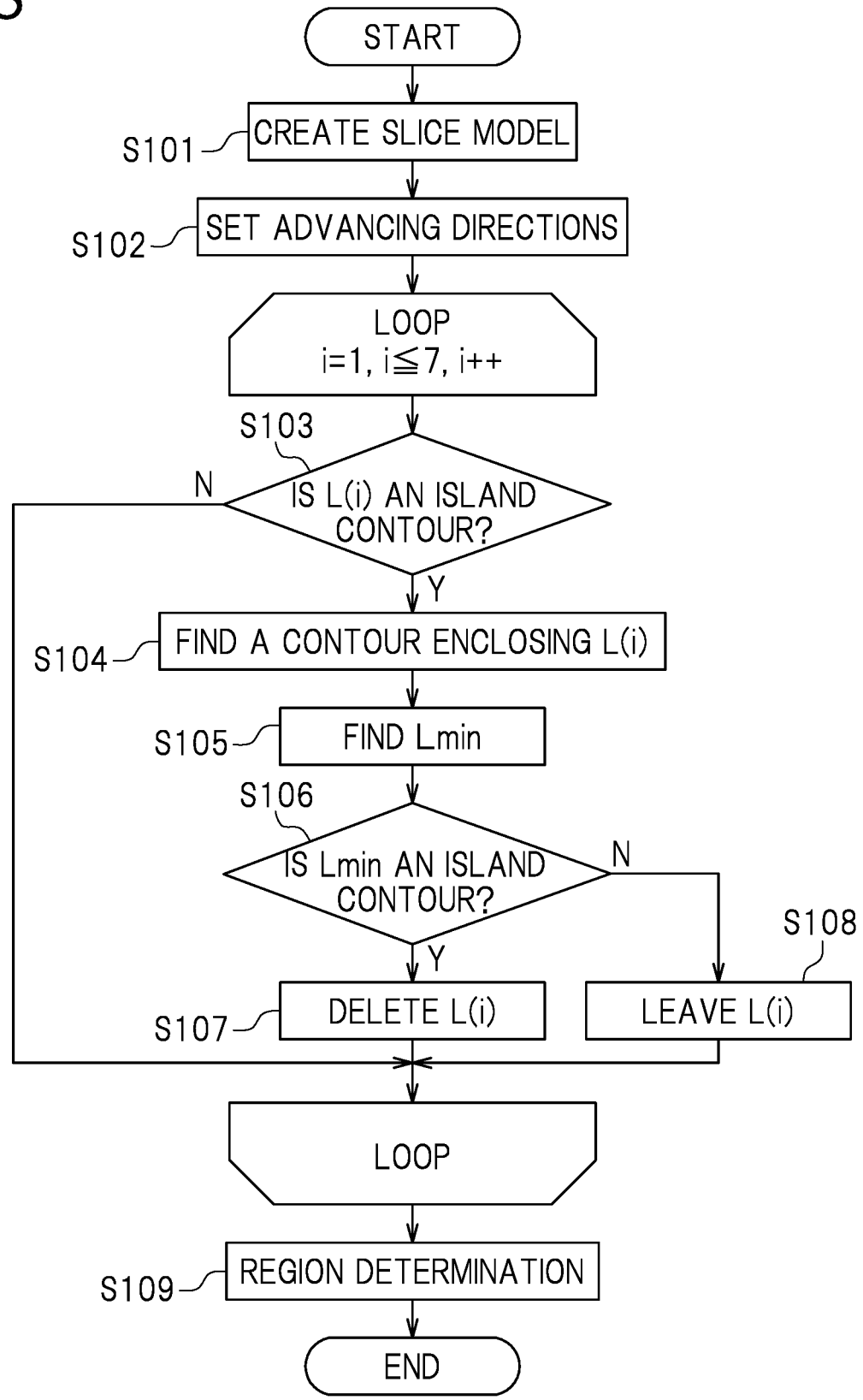
FIG. 5 is a flowchart showing a procedure of making a region determination after an unnecessary contour is deleted from the slice model.
Figure 6:
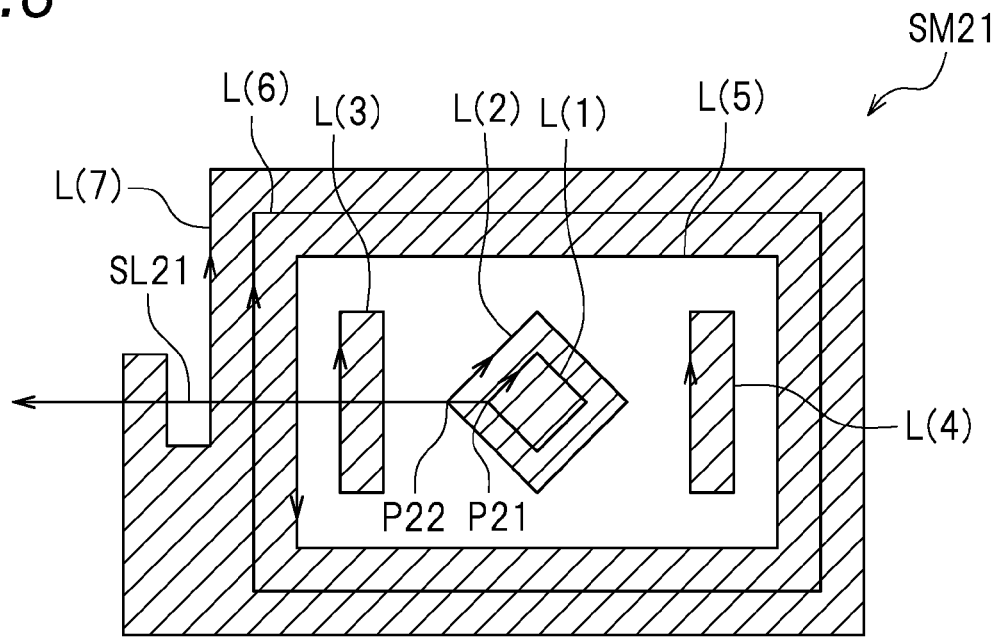
FIG. 6 shows an example of slice model.

FIG. 5 is a flowchart showing a procedure of performing a region determination after an unnecessary contour is deleted. FIG. 6 shows an example of slice model SM21. In FIG. 6, the hatched regions are printing regions of the slice model SM21. In this example, the slice model SM21 shown in FIG. 6 will be used to describe the procedure by which the region determination device 100 deletes an unnecessary contour from the slice model SM21 and then determines which region of the slice model SM21 is a printing region and which region thereof is a non-printing region.

The slice model SM21 shown in FIG. 6 is defined by contours L(1) through L(7). Among the contours L(1) through L(7), the contours L(1) through L(4), L(6) and L(7) are island contours. The contour L(5) is a hole contour. In this example, the closest enclosing contour for the island contour L(1) is the contour L(2). The closest enclosing contour for the island contour L(6) is the contour L(7). Therefore, the island contours L(1) and L(6) are unnecessary for the slice model SM12 shown in FIG. 6, namely, are deletion targets.

First, in step S101, a slice model is created. In this example, a three-dimensional model of a three-dimensional printing object to be printed is sliced at a predetermined interval in a horizontal direction to create a plurality of two-dimensional slice models respectively corresponding to cross-sectional shapes of the three-dimensional printing object. The slice model SM21 shown in FIG. 6 is one of the plurality of created slice models.

Next, in step S102, an advancing direction is set for each of the contours of the slice model SM21. In this example, the advancing direction of each of the island contours L(1) through L(4), L(6) and L(7) is set to the clockwise direction. By contrast, the advancing direction of the hole contour L(5) is set to the counterclockwise direction.

Next, processes of steps S103 through S108 described below are performed on the contours L(1) through L(7). In this example, a procedure of steps S103 through S108 performed on the contour L(1) as a target will be described. Hereinafter, the contour as the target will be referred to as a "target contour".

First, in step S103, it is determined whether the target contour L(1) is an island contour or a hole contour. In this example, first, the region determination device 100 extracts the contour L(1), which is to be the target contour, among the contours L(1) through L(7) of the slice model SM21, and sets the extracted contour L(1) as a target contour. The region determination device 100 determines whether the target contour L(1) is an island contour or a hole contour based on the advancing direction of the target contour L(1). In the case where the target contour L(1) is determined to be an island contour, a process of step of S104 is executed next. In this example, the target contour L(1) is an island contour, and therefore, the process of step S104 is executed next. By contrast, in the case where the target contour L(1) is determined to be a hole contour, processes of steps S104 through S108 described below are not executed. The next contour L(2) is set as a target contour, and the processes of steps S103 through S108 are executed on the contour L(2). For example, it is assumed that the target contour is the contour L(5). In this case, since the target contour L(5) is a hole contour, the processes of steps S104 through S108 are not executed. The next contour L(6) is set as a target contour, and the processes of steps S103 through S108 are executed on the contour L(6).

Next, in step S104, a contour that encloses the target contour L(1) is determined. Herein, the "contour that encloses the target contour" is a contour that forms a closed space and accommodates the target contour in the closed space. In this example, first, a scanning line SL21 is set for the target contour L(1). An end of the scanning line SL21 is a predetermined point on the target contour L(1). There is no specific limitation on the position of the one end of the scanning line SL21, namely, there is no specific limitation on the predetermined position. The position of the one end of the scanning line SL21 is, for example, at a leftmost point P21 on the target contour L(1). The scanning line SL21 is to be scanned in a predetermined direction from the point P21. The predetermined direction is, for example, the leftward direction from the point P21 in FIG. 6. There is no specific limitation on the predetermined direction. For example, the predetermined direction may be the rightward direction from the point P21 or the upward direction from the point P21.

After the scanning line SL21 is set, the number of points at which the scanning line SL21 crosses each of the contours other than the contour L(1), namely, the contours L(2) through L(7), is counted. For example, in FIG. 6, the scanning line SL21 crosses the contour L(2) at a point P22. The number of the crossing point(s) (hereinafter, referred to also as "intersection(s)") is "1". Similarly, the number of point(s) at which the scanning line SL21 crosses each of the contour L(3), the contour L(4), the contour L(5), the contour L(6), and the contour L(7) is respectively "2", "0", "1", "1" and "3". In this preferred embodiment, a contour that crosses the scanning line SL21 at an odd number of intersection(s) is determined to enclose the target contour L(1). In FIG. 6, the scanning line SL21 crosses each of the contours L(2) and L(5) through L(7) at an odd number of intersection (s). Therefore, in this example, the contours L(2) and L(5) through L(7) are determined to enclose the target contour L(1). Information on the contours enclosing the target contour L(1) is stored on the region determination device 100. By contrast, a contour that crosses the scanning line SL21 at an even number of intersection(s) is determined not to enclose the target contour L(1). In FIG. 6, the scanning line SL21 crosses each of the contours L(3) and L(4) at an even number of intersection(s). In this example, the contours L(3) and L(4) are located outer to the target contour L(1), but do not enclose the contour L(1). Therefore, the contours L(3) and L(4) are determined not to enclose the target contour L(1).

Next, in step S105, a closest enclosing contour Lmin for the target contour L(1) is determined from the contours L(2) and L(5) through L(7), which enclose the target contour L(1). In this example, first, the minimum distance between the target contour L(1) and each of the contours L(2) and L(5) through L(7) is determined. In more detail, the minimum distance between the one end P21 of the scanning line SL21 on the target contour L(1) and each of the contours L(2) and L(5) through L(7) is determined. The contour having the shortest distance from the one end P21 among the minimum distances between the one end P21 and the contours L(2) and L(5) through L(7) is set as the closest enclosing contour Lmin. In the slice model SM21 shown in FIG. 6, the contour having the shortest distance from the one end P21 among the minimum distances between the target contour L(1) and the contours L(2) and L(5) through L(7) enclosing the target contour L(1) is the contour L(2). Therefore, in this case, the contour L(2) is the closest enclosing contour Lmin for the target contour L(1).

Next, in step S106, it is determined whether the closest enclosing contour Lmin is an island contour or a hole contour. In this example, it is determined whether the closest enclosing contour Lmin is an island contour or a hole contour based on the advancing direction of the closest enclosing contour Lmin. In the case where the advancing direction of the closest enclosing contour Lmin is the clockwise direction and the closest enclosing contour Lmin is determined to be an island contour, the procedure goes to step S107. In this example, the closest enclosing contour Lmin is the contour L(2). The contour L(2) is an island contour. Therefore, in this case, the procedure goes to step S107. By contrast, in the case where the advancing direction of the closest enclosing contour Lmin is the counterclockwise direction and the closest enclosing contour Lmin is determined to be a hole contour, the procedure goes to step S108. In the case where, for example, the target contour is the contour L(3), the closest enclosing contour Lmin is the contour L(5). The contour L(5) is a hole contour. Therefore, in the case where the target contour is the contour L(3), the procedure goes to step S108.

In the case where the closest enclosing contour Lmin is determined to be an island contour, in the next step S107, the target contour L(1) is deleted from the slice model SM21. In this example, the closest enclosing contour Lmin (contour L(2)) is an island contour enclosing the target contour L(1) at the closest position. Therefore, the provision of the target contour L(1) may undesirably cause the region determination device 100 to make a wrong determination on the printing region. Therefore, the target contour L(1) is unnecessary for the slice model SM21 shown in FIG. 6. Therefore, in step S107, the region determination device 100 deletes the target contour L(1) from the slice model SM21.

In the case where the closest enclosing contour Lmin is determined to be a hole contour, namely, is determined not to be an island contour, in the next step S108, the target contour L(1) is not deleted from the slice model SM21, and the process of step S108 is finished.

After the process of step S107 or S108 is finished, the target contour is changed, and the processes of steps S103 through S108 are executed by the number of the other contours.

Figure 7:
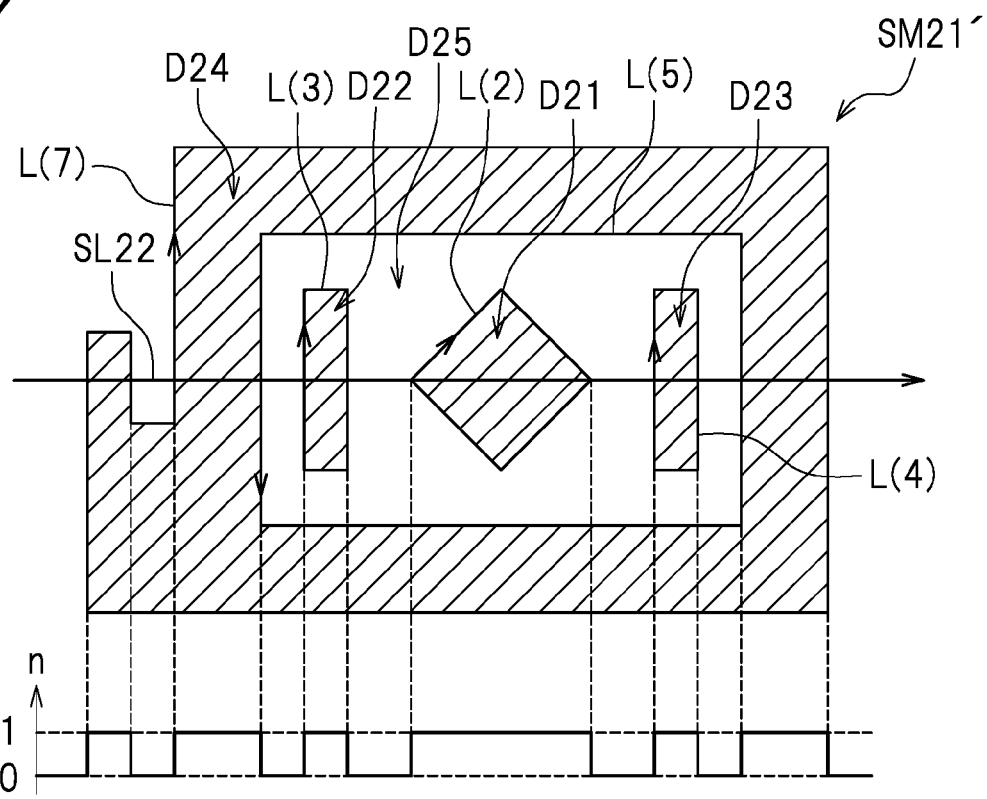
FIG. 7 shows a slice model obtained as a result of deleting unnecessary contours from the slice model shown in FIG. 6.

In the slice model SM21 shown in FIG. 6, the closest enclosing contour for the contour L(1) is the island contour L(2). Therefore, the contour L(1) is deleted from the slice model SM21. Similarly, the closest enclosing contour for the contour L(6) is the island contour L(7), and therefore, the contour L(6) is deleted from the slice model SM21. The slice model obtained as a result of deleting the unnecessary contours, namely, a slice model SM21', is as shown in FIG. 7. In FIG. 7, the hatched regions are printing regions. The slice model SM21' obtained as a result of deleting the unnecessary contours is stored on the region determination device 100.

The processes of steps S103 through S108 are executed in repletion by the number of the contours to delete unnecessary contours. Then, in step S109, the region determination device 100 may determine which region of the slice model SM21' is a printing region and which region thereof is a non-printing region by substantially the same method as in the conventional art. For example, as shown in FIG. 7, a scanning line SL22 for region determination is set so as to cross the contours L(2) through L(5) and L(7). The scanning line SL22 is scanned in the left-to-right direction in FIG. 7 to change the value of the internal level n. In this example, the value of the internal level n is changed as shown in FIG. 7. A region corresponding to a value of the internal level n that is not "0" is determined to be a printing region. By contrast, a region corresponding to the value of the internal level n that is "0" is determined to be a non-printing region. In this manner, after the slice model SM21 shown in FIG. 6 is changed to the slice model SM21' shown in FIG. 7, the region of the slice model SM21' is divided into a printing region and a non-printing region appropriately.

The processes of steps S102 through S109 are performed also on the other slice models. In this manner, the region of each of the plurality of slice models corresponding to the cross-sectional shapes of the three-dimensional printing object is divided into a printing region and a non-printing region.

After the region of each slice model is divided into a printing region and a non-printing region by the region determination device 100, the three-dimensional printing object is printed in accordance with the slice models. For example, the slice model SM21' shown in FIG. 7 is used to print a cross-sectional shape corresponding to the slice model SM21'. Specifically, the photocurable resin 23 located at positions corresponding to printing regions D21 through D24 is irradiated with light emitted from the projector 31, and thus the photocurable resin 23 located at the positions corresponding to the printing regions D21 through D24 is cured. By contrast, the photocurable resin 23 located at a position corresponding to a non-printing region D25 is not irradiated with the light emitted from the projector 31. Thus, no cross-sectional shape is printed at the position corresponding to the non-printing region D25.

In this preferred embodiment, as shown in FIG. 3, the region determination device 100 includes a storage processor 52, an advancing direction setting processor 54, a target contour setting processor 56, a first contour determination processor 58, a closest enclosing contour determination processor 60, a second contour determination processor 62, a deletion processor 64, and a region determination processor 66. The processors preferably execute a computer program (hereinafter, referred to as a "program") stored on the region determination device 100.

The storage processor 52 is configured or programmed to store a printing object model of the three-dimensional printing object to be printed by the three-dimensional printing system 10 and also to store slice models obtained as a result of slicing the printing object model at a predetermined interval. The storage processor 52 is also configured or programmed to store information on contours enclosing the target contour that are determined in step S104 shown in FIG. 5. The storage processor 52 is configured or programmed to store the slice model SM21' obtained as a result of deleting the unnecessary contours.

The advancing direction setting processor 54 is configured or programmed to set an advancing direction for the island contours L(1) through L(4), L(6) and L(7) of the slice model SM21 stored by the storage processor 52 and a different advancing direction for the hole contour L(5) of the slice model SM21. In this example, the advancing direction setting processor 54 is configured or programmed to set the clockwise direction as the advancing direction of the island contours L(1) through L(4), L(6) and L(7) and to set the counterclockwise direction as the advancing direction of the hole contour L(5). In this preferred embodiment, the clockwise direction corresponds to the "first direction". The counterclockwise direction corresponds to the "second direction opposite to the first direction". The advancing direction setting processor 54 executes the process of step S102 shown in FIG. 5.

The target contour setting processor 56 is configured or programmed to extract a predetermined contour from the contours L(1) through L(7) of the slice model SM21 stored by the storage processor and set the extracted contour as a target contour. In the above-described example, the target contour setting processor 56 executes, among the processes of step S103, a process of setting the contour L(1) as a target contour. In this example, the contour L(1) corresponds to the predetermined contour.

The first contour determination processor 58 is configured or programmed to execute, among the processes of step S104 shown in FIG. 5, a process of determining whether the target contour L(1) set by the target contour setting processor 56 is an island processor or not. In this example, in the case where the advancing direction of the contour L(1) is the clockwise direction, the first contour determination processor 58 determines the target contour L(1) to be an island contour. In the case where, for example, the target contour is the contour L(5), the advancing direction of the contour L(5) is the counterclockwise direction and therefore, the first contour determination processor 58 determines the target contour L(5) to be a hole contour.

The closest enclosing contour determination processor 60 is configured or programmed to, in the case where the target contour L(1) is determined to be an island region by the first contour determination processor 58, determine whether a closest enclosing contour Lmin has been set for the target contour L(1) or not. Specifically, the closest enclosing contour determination processor 60 includes a scanning line setting processor 60a, a count processor 60b, a first enclosure determination processor 60c, a distance calculation processor 60d, and a second enclosure determination processor 60e. The closest enclosing contour determination processor 60 is configured or programmed to determine whether the closest enclosing contour Lmin has been set for the target contour L(1) or not by the scanning line setting processor 60a, the count processor 60b, the first enclosure determination processor 60c, the distance calculation processor 60d, and the second enclosure determination processor 60e. In the slice model SM21 shown in FIG. 6, the contour L(7) is not enclosed by any contour. Therefore, in the case where the target contour is the contour L(7), the closest enclosing contour determination processor 60 determines that the closest enclosing contour Lmin has not been set for the target contour L(7).

The scanning line setting processor 60a is configured or programmed to execute, among the processes of step S104 shown in FIG. 5, a process of setting the scanning line SL21. The scanning line setting processor 60a is configured or programmed to set the scanning line SL21 such that the scanning line SL21 is directed in a predetermined direction from a predetermined point on the target contour L(1). In this example, the predetermined point is, for example, the leftmost point P21 on the target contour L(1). The predetermined direction is, for example, the leftward direction from the leftmost point P21 in FIG. 6.

The count processor 60b is configured or programmed to execute, among the processes of step S104 shown in FIG. 5, a process of counting the number of intersection(s) at which the scanning line SL21 set by the scanning line setting processor 60a crosses each of the contours of the slice model SM21 other than the target contour L(1), namely, the contours L(2) through L(7).

The first enclosure determination processor 60c is configured or programmed to execute, among the processes of step S104 shown in FIG. 5, a process of, in the case where the number of the intersection(s) counted by the count processor 60b is an odd number, determining that the corresponding contour(s) (in FIG. 6, the contours L(2) and L(5) through L(7)) is(are) located so as to enclose the target contour L(1). The first enclosure determination processor 60c is configured or programmed to execute, among the processes of step S104 shown in FIG. 5, a process of, in the case where the number of the intersection(s) counted by the count processor 60b is an even number, determining that the corresponding contour(s) (in FIG. 6, the contours L(3) and L(4)) is(are) not located so as to enclose the target contour L(1).

The distance calculation processor 60d is configured or programmed to execute, among the processes of step S105 shown in FIG. 5, a process of calculating a distance between each of the contours, determined by the first enclosure determination processor 60c to be located so as to enclose the target contour L(1), and the target contour L(1). Herein, the "distance" refers to the minimum distance. In the case where, for example, the target contour is the contour L(1) in FIG. 6, the contours located so as to enclose the target contour L(1) are contours L(2) and L(5) through L(7). Therefore, in this example, the distance calculation processor 60d is configured or programmed to determine the minimum distance between the target contour L(1) and each of the contour L(2) and L(5) through L(7).

The second enclosure determination processor 60e is configured or programmed to determine, as the closest enclosing contour Lmin, the contour corresponding to the shortest distance among the distances between the target contour L(1) and the contours L(2) and L(5) through L(7)

calculated by the distance calculation processor 60d. In this example, the shortest distance among the distances is the distance between the target contour L(1) and the contour L(2). Therefore, the second enclosure determination processor 60e sets the contour L(2) as the closest enclosing contour Lmin.

The second contour determination processor 62 is configured or programmed to, in the case where the closest enclosing contour Lmin is determined by the closest enclosing contour determination processor 60 to have been set, determine whether the closest enclosing contour Lmin is an island contour or not. In this example, the second contour determination processor 62 is configured or programmed to determine whether the closest enclosing contour Lmin determined by the second enclosure determination processor 60e in the closest enclosing contour determination processor 60 is an island contour or not. The second contour determination processor 62 is configured or programmed to, in the case where the advancing direction of the closest enclosing contour Lmin is the clockwise direction, determine the closest enclosing contour Lmin to be an island contour. The second contour determination processor 62 is configured or programmed to, in the case where, by contrast, the advancing direction of the closest enclosing contour Lmin is the counterclockwise direction, determine the closest enclosing contour Lmin to be a hole contour. The second contour determination processor 62 executes the process of step S106 shown in FIG. 5.

The deletion processor 64 is configured or programmed to, in the case where the closest enclosing contour Lmin is determined to be an island contour by the second contour determination processor 62, delete the target contour L(1) from the slice model SM21. From the slice model SM21 shown in FIG. 6, the contours L(1) and L(6) are deleted. The deletion processor 64 is configured or programmed to store, on the storage processor 52, the slice model SM21' (see FIG. 7) obtained as a result of deleting the target contours L(1) and L(6). The deletion processor 64 executes the process of step S107 shown in FIG. 5.

The region determination processor 66 is configured or programmed to divide the region of the slice model SM21' stored on the storage processor 52, namely, the region of the slice model SM21' obtained as a result of deleting the contours L(1) and L(6) by the deletion processor 64, into a printing region and a non-printing region. There is no specific limitation on the method by which the region determination processor 66 makes a region determination on the slice model SM21'. For example, the conventional method in step S109 shown in FIG. 5 may be used.

As described above, conventionally, in the case of, for example, the slice model SM110 in which the island contour L111 and the hole contour L113 have another contour L112 therebetween as shown in FIG. 10, the region D113 may be undesirably determined to be a printing region although the region D113 is a non-printing region. A conceivable reason for this is that the contour enclosing the island contour L112 at the closest position thereto is the island contour L111. This may occur to the slice model SM110 obtained as a result of slicing the three-dimensional printing object A100 at a border between the plurality of objects included in the three-dimensional printing object A100, for example, at the position P110 shown in FIG. 8B. The island contour L112 is an unnecessary contour for making a determination on the printing region. In this situation, as shown in FIG. 6, the region determination device 100 uses the closest enclosing contour determination processor 60 to determine whether or not the closest enclosing contour Lmin has been set for the target contour L(1), which is an island contour. The second contour determination processor 62 is configured or programmed to, in the case where the closest enclosing contour determination processor 60 determines that the closest enclosing contour Lmin has been set, determine whether the closest enclosing contour Lmin is an island contour or not. The deletion processor 64 is configured or programmed to, in the case where the closest enclosing contour Lmin is an island contour, delete the target contour L(1) from the slice model SM21. In this manner, an island contour unnecessary for making a determination on the printing region, such as the target contour L(1) shown in FIG. 6, is deleted from the slice model SM21. Therefore, even in the case where the island contour L(1) is enclosed by the island contour L(2) at the closest position thereto as in the slice model SM21 shown in FIG. 6, the region of the slice model SM21 is divided into a printing region and a non-printing region with certainty.

In this preferred embodiment, in the case where the number of intersection(s) at which the scanning line SL21, set so as to be directed in a predetermined direction (e.g., the leftward direction in FIG. 6) from the predetermined position P21 on the slice model SM21, crosses one contour other than the target contour L(1) is an odd number, the one contour encloses the target contour L(1). In the slice model SM21 shown in FIG. 6, the contours L(2) and L(5) through L(7) enclose the target contour L(1). In this example, among the contours L(2) and L(5) through L(7) enclosing the target contour L(1), the contour located closest to the target contour L(1) is determined to be the closest enclosing contour Lmin for the target contour L(1). In the slice model SM21 shown in FIG. 6, the closest enclosing contour Lmin is the contour L(2). In the case where the closest enclosing contour Lmin (contour L(2)) is an island contour, the target contour L(1) is deleted from the slice model SM21.

In this preferred embodiment, the advancing direction setting processor 54 is configured or programmed to set the clockwise direction as the advancing direction of an island contour. The advancing direction setting processor 54 is also configured or programmed to set the counterclockwise direction as the advancing direction of a hole contour. Therefore, the first contour determination processor 58 easily determines whether the target contour L(1) is an island contour or a hole contour by determining whether the advancing direction of the target contour L(1) is the clockwise direction or the counterclockwise direction. The second contour determination processor 62 easily determines whether the closest enclosing contour Lmin is an island contour or not by determining whether the advancing direction of the closest enclosing contour Lmin is the clockwise direction or the counterclockwise direction.

The processors of the region determination device 100, namely, the storage processor 52, the advancing direction setting processor 54, the target contour setting processor 56, the first contour determination processor 58, the closest enclosing contour determination processor 60 (the scanning line setting processor 60a, the count processor 60b, the first enclosure determination processor 60c, the distance calculation processor 60d, and the second enclosure determination processor 60e), the second contour determination processor 62, the deletion processor 64, and the region determination processor 66, may be implemented by one processor included in the region determination device 100. Alternatively, the processors may be implemented by a plurality of processors. According to various preferred embodiments of the present invention, the expression "is configured or programmed" encompasses executing a computer program stored on a computer. Various preferred embodiments of the present invention encompass a non-transitory computer readable medium having the computer program stored thereon temporarily. Various preferred embodiments of the present invention encompass a circuit having substantially the same function as that of the program to be executed by each of the processors. In this case, the storage processor 52, the advancing direction setting processor 54, the target contour setting processor 56, the first contour determination processor 58, the closest enclosing contour determination processor 60 (the scanning line setting processor 60a, the count processor 60b, the first enclosure determination processor 60c, the distance calculation processor 60d, and the second enclosure determination processor 60e), the second contour determination processor 62, the deletion processor 64, and the region determination processor 66 may be respectively replaced with a storage circuit 52, an advancing direction setting circuit 54, a target contour setting circuit 56, a first contour determination circuit 58, a closest enclosing contour determination circuit 60 (a scanning line setting circuit 60a, a count circuit 60b, a first enclosure determination circuit 60c, a distance calculation circuit 60d, and a second enclosure determination circuit 60e), a second contour determination circuit 62, a deletion circuit 64, and a region determination circuit 66.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system, comprising:
a three-dimensional printing device that prints a three-dimensional printing object;
a region determination device for a slice model, the region determination device dividing a region of the slice model into a printing region to be printed and a non-printing region not to be printed, the slice model being obtained as a result of slicing a three-dimensional model of a three-dimensional printing object at a predetermined interval and being defined by contours representing profiles of the three-dimensional printing object, wherein the contours include an island contour representing a shape of an outer profile of the printing region of the three-dimensional printing object and a hole contour representing a shape of a hole in the three-dimensional printing object, the region determination device comprising:
a storage processor configured or programmed to store the slice model;
a target contour setting processor configured or programmed to extract a predetermined contour from the contours of the slice model stored by the storage processor and set the extracted predetermined contour as a target contour;
a first contour determination processor configured or programmed to determine whether the target contour set by the target contour setting processor is the island contour or not;
a closest enclosing contour determination processor configured or programmed to, in a case in which the target contour is determined by the first contour determination processor to be the island contour, determine whether a closest enclosing contour enclosing the target contour at a closest position thereto has been set or not;
a second contour determination processor configured or programmed to, in a case in which the closest enclosing contour is determined by the closest enclosing contour determination processor to have been set, determine whether the closest enclosing contour is the island contour or not;
a deletion processor configured or programmed to, in a case in which the closest enclosing contour is determined by the second contour determination processor to be the island contour, deletes the target contour from the slice model and stores, on the storage processor, a slice model obtained as a result of deleting the target contour from the slice model; and
a region determination processor configured or programmed to divide the region of the slice model stored on the storage processor into the printing region and the non-printing region, wherein
the three-dimensional printing device prints the three-dimensional printing object according to the printing region and the non-printing region determined by the region determination processor.

2. The three-dimensional printing system according to claim 1, wherein
the closest enclosing contour determination processor includes:
a scanning line setting processor configured or programmed to set a scanning line directed in a predetermined direction from a predetermined point on the target contour;
a count processor configured or programmed to count a number of intersection(s) at which the scanning line set by the scanning line setting processor and one of the contours of the slice model other than the target contour, cross each other;
a first enclosure determination processor configured or programmed to, in a case in which the number of the intersection(s) counted by the count processor is an odd number, determine that the one of the contours is located so as to enclose the target contour, and in a case in which number of the intersection(s) counted by the count processor is an even number, determine that the one of the contours is not located so as to enclose the target contour;
a distance calculation processor configured or programmed to, in a case in which the one of the contours is determined by the first enclosure determination processor to be located so as to enclose the target contour, calculate a distance between the target contour and the one of the contours; and a second enclosure determination processor configured or programmed to, in a case in which there are a plurality of the one of the contours determined by the first enclosure determination processor to be located so as to enclose the target contour, determine the one of the contours, corresponding to a shortest distance among the distances calculated by the distance calculation processor, to be the closest enclosing contour; wherein the second contour determination processor is configured or programmed to determine whether the closest enclosing contour determined by the second enclosure determination processor is the island contour or not.

3. The three-dimensional printing system according to claim 1, further including an advancing direction setting processor configured or programmed to set an advancing direction of the island contour of the slice model stored by the storage processor to a first direction and set an advancing direction of the hole contour of the slice model to a second direction opposite to the first direction; wherein the first contour determination processor is configured or programmed to, in a case in which the advancing direction of the target contour set by the target contour setting processor is the first direction set by the advancing direction setting processor, determine the target contour to be the island contour; and the second contour determination processor is configured or programmed to, in a case in which the advancing direction of the closest enclosing contour is the first direction set by the advancing direction setting processor, determine the closest enclosing contour to be the island contour.

4. A method of printing a three-dimensional object including a region determination method for a slice model, the region determination method dividing a region of the slice model into a printing region to be printed and a non-printing region not to be printed, the slice model being obtained as a result of slicing a three-dimensional model of a three-dimensional printing object at a predetermined interval and being defined by contours representing profiles of the three-dimensional printing object, wherein the contours include an island contour representing a shape of an outer profile of the printing region of the three-dimensional printing object and a hole contour representing a shape of a hole in the three-dimensional printing object, the region determination method comprising:

a storage step of storing the slice model;

a target contour setting step of extracting a predetermined contour from the contours of the slice model stored in the storage step and setting the extracted predetermined contour as a target contour;

a first contour determination step of determining whether the target contour set in the target contour setting step is the island contour or not;

a closest enclosing contour determination step of, in a case in which the target contour is determined in the first contour determination step to be the island contour, determining whether a closest enclosing contour enclosing the target contour at a closest position thereto has been set or not;

a second contour determination step of, in a case in which the closest enclosing contour is determined in the closest enclosing contour determination step to have been set, determining whether the closest enclosing contour is the island contour or not;

a deletion step of, in a case in which the closest enclosing contour is determined in the second contour determination step to be the island contour, deleting the target contour from the slice model and storing a slice model obtained as a result of deleting the target contour from the slice model;

a region determination step of dividing the region of the slice model stored in the storage step or the deletion step into the printing region and the non-printing region; and an emission step of emitting light to a photocurable resin according to the printing region and the non-printing region determined in the region determination step.

5. The method of printing a three-dimensional object according to claim 4, wherein the closest enclosing contour determination step includes:

a scanning line setting step of setting a scanning line directed in a predetermined direction from a predetermined point on the target contour;

a count step of counting a number of intersection(s) at which the scanning line set in the scanning line setting step and one of the contours of the slice model other than the target contour, cross each other;

a first enclosure determination step of, in a case in which the number of the intersection(s) counted in the count step is an odd number, determining that the one of the contours is located so as to enclose the target contour, and in a case in which number of the intersection(s) counted in the count step is an even number, determining that the one of the contours is not located so as to enclose the target contour;

a distance calculation step of, in a case in which the one of the contours is determined in the first enclosure determination step to be located so as to enclose the target contour, calculating a distance between the target contour and the one of the contours; and a second enclosure determination step of, in a case in which there are a plurality of the one of the contours determined in the first enclosure determination step to be located so as to enclose the target contour, determining the one contour, corresponding to a shortest distance among the distances calculated in the distance calculation step, to be the closest enclosing contour; and in the second contour determination step, it is determined whether the closest enclosing contour determined in the second enclosure determination step is the island contour or not.

6. The method of printing a three-dimensional object according to claim 4, further including an advancing direction setting step of setting an advancing direction of the island contour of the slice model stored in the storage step to a first direction and setting an advancing direction of the hole contour of the slice model to a second direction opposite to the first direction; wherein in the first contour determination step, in a case in which the advancing direction of the target contour set in the target contour setting step is the first direction set in the advancing direction setting step, the target contour is determined to be the island contour; and in the second contour determination step, in a case in which the advancing direction of the closest enclosing contour is the first direction set in the advancing direction setting step, the closest enclosing contour is determined to be the island contour.

7. The three-dimensional printing system according to claim 1, wherein the three-dimensional printing device includes a projector and a controller that controls the projector to emit light to a photocurable resin located at positions corresponding to the printing region and not to emit light to a photocurable resin located at positions corresponding to the non-printing region.

8. The method of printing a three-dimensional object according to claim 4, wherein the emission step includes emitting light to a photocurable resin located at positions corresponding to the printing region without emitting light to a photocurable resin located at positions corresponding to the non-printing region.

* * * * *